(12) United States Patent
O'Malley et al.

(10) Patent No.: US 12,190,836 B2
(45) Date of Patent: Jan. 7, 2025

(54) MULTI-ELEMENT PIXEL ELECTRODE CIRCUITS FOR ELECTRO-OPTIC DISPLAYS AND METHODS FOR DRIVING THE SAME

(71) Applicant: E INK CORPORATION, Billerica, MA (US)

(72) Inventors: Timothy J. O'Malley, Westford, MA (US); Karl Raymond Amundson, Cambridge, MA (US); Chih-Hsiang Ho, Andover, MA (US); Jonathan L. Zalesky, Newton, MA (US); Yi Lu, Needham, MA (US); Ian French, Hsinchu (TW)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/420,455

(22) Filed: Jan. 23, 2024

(65) Prior Publication Data
US 2024/0257773 A1 Aug. 1, 2024

Related U.S. Application Data

(60) Provisional application No. 63/481,964, filed on Jan. 27, 2023.

(51) Int. Cl.
*G09G 3/00* (2006.01)
*G02F 1/167* (2019.01)
(Continued)

(52) U.S. Cl.
CPC ............. *G09G 3/344* (2013.01); *G02F 1/167* (2013.01); *G02F 1/16766* (2019.01); *G09G 2320/041* (2013.01)

(58) Field of Classification Search
CPC ............... G02F 1/167; G02F 1/16766; G09G 2300/0426; G09G 2300/0439;
(Continued)

(56) References Cited

U.S. PATENT DOCUMENTS

| 4,418,346 A | 11/1983 | Batchelder |
| 4,460,247 A | 7/1984 | Hilsum et al. |

(Continued)

OTHER PUBLICATIONS

European Patent Office, "International Search Report and Written Opinion", PCT/US2024/012674, Apr. 27, 2024.
(Continued)

*Primary Examiner* — Insa Sadio
(74) *Attorney, Agent, or Firm* — Jason P. Colangelo

(57) ABSTRACT

An electro-optic display including a first subpixel electrode and a second subpixel electrode associated with a display pixel, and an electrophoretic display medium disposed between a common electrode and the first and second subpixel electrodes. The electro-optic display also includes a display controller circuit in electrical communication with the common electrode and a first transistor associated with the display pixel. The display controller circuit is capable of applying waveforms to the display pixel by applying one or more time-dependent voltages between the common electrode and the first subpixel electrode via the first transistor, where the one or more time-dependent voltages are applied to the first subpixel electrode. The electro-optic display also includes a second transistor in electrical communication with the first subpixel electrode and the second subpixel electrode. A first enable signal activates the second transistor to place the first subpixel electrode and the second subpixel electrode into electrical communication.

20 Claims, 11 Drawing Sheets

(51) Int. Cl.
*G02F 1/16766* (2019.01)
*G09G 3/34* (2006.01)

(58) Field of Classification Search
CPC ....... G09G 2300/0819; G09G 2310/08; G09G 2320/041; G09G 3/344
See application file for complete search history.

(56) References Cited

U.S. PATENT DOCUMENTS

| | | | |
|---|---|---|---|
| 5,088,806 A | 2/1992 | McCartney et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,801,183 B2 | 10/2004 | Pan et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,422,117 B2 | 4/2013 | Komatsu |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,576 B2 | 1/2015 | Yamazaki |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,299,294 B2 | 3/2016 | Lin et al. |
| 9,373,289 B2 | 6/2016 | Sprague et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,436,014 B2 | 9/2016 | Kroon et al. |
| 9,460,666 B2 | 10/2016 | Sprague et al. |
| 9,495,918 B2 | 11/2016 | Harrington et al. |

(56) References Cited

U.S. PATENT DOCUMENTS

| | | | |
|---|---|---|---|
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,966,018 B2 | 5/2018 | Gates et al. |
| 10,229,641 B2 | 3/2019 | Yang et al. |
| 10,319,313 B2 | 6/2019 | Harris et al. |
| 10,339,876 B2 | 7/2019 | Lin et al. |
| 10,444,553 B2 | 10/2019 | Laxton |
| 10,672,350 B2 | 6/2020 | Amundson et al. |
| 11,049,463 B2 | 6/2021 | Lin et al. |
| 2003/0102858 A1 | 6/2003 | Jacobson et al. |
| 2004/0246562 A1 | 12/2004 | Chung et al. |
| 2004/0262612 A1* | 12/2004 | Vidal .............. G02F 1/133348 257/72 |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0005720 A1 | 1/2015 | Zang et al. |
| 2015/0262255 A1 | 9/2015 | Khajehnouri et al. |
| 2016/0012710 A1 | 1/2016 | Lu et al. |
| 2016/0140910 A1 | 5/2016 | Amundson |
| 2016/0180777 A1 | 6/2016 | Lin et al. |
| 2019/0228709 A1* | 7/2019 | Wang .................. G09G 3/3258 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), 24 (Mar. 2002).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

MULTI-ELEMENT PIXEL ELECTRODE CIRCUITS FOR ELECTRO-OPTIC DISPLAYS AND METHODS FOR DRIVING THE SAME

CROSS-REFERENCE TO RELATED APPLICATIONS

This application claims priority to U.S. Provisional Application 63/481,964, filed on Jan. 27, 2023, the entire contents of which are incorporated herein by reference. Further, the entire contents of any patent, published application, or other published work referenced herein are incorporated by reference in their entireties.

FIELD OF THE INVENTION

This invention relates to methods for driving bistable electro-optic displays according to environmental conditions, and to apparatuses for use in such methods. In particular, this invention relates to methods for driving bistable electro-optic displays according to a temperature compensation scheme, and display pixel circuits for use in such methods.

BACKGROUND OF THE INVENTION

Electrophoretic display media, generally characterized by the movement of particles through an applied electric field, are highly reflective, can be made bistable, can be scaled to a large area, and consume very little power. Encapsulated electrophoretic displays also enable the display to be printed. These properties allow encapsulated electrophoretic display media to be used in many applications for which traditional electronic displays are not suitable, such as flexible displays.

In many cases, it is desirable to measure and analyze certain environmental factors that can adversely affect the performance of a display in order that a responsive event or action may then be taken. For example, the electrical properties of encapsulated electrophoretic display media may vary in response to environmental factors such as temperature. It has been observed that temperature-induced display artifacts such as lateral coupling and blooming are typically most pronounced during periods of high temperature when the impedance of the front plane laminate or "FPL" has decreased and a voltage waveform applied to the electrode of one display pixel is most likely to undesirably impact the optical state of neighboring display pixels.

In some circumstances, in order to achieve a repeatable optical state in the display, it may be desirable to alter the manner in which drive waveforms are applied to the display pixels in response to changes in electrical properties of the polymeric materials that comprise encapsulated electrophoretic display media. Thus, it is desirable to measure environmental factors such as temperature that may affect the performance of electrophoretic displays and to implement a temperature-compensated drive scheme in response.

SUMMARY OF THE INVENTION

Conventional solutions are derived from liquid crystal display technology, and are thus based on the assumption that temperature compensation can be achieved by simply adjusting the voltage applied to the display pixels. However, electrophoretic displays have unique characteristics at different temperature ranges which cannot be addressed by voltage adjustment alone.

Other conventional solutions have endeavored to compensate for some of the undesirable display artifacts using display pixel electrodes that are broken up into multiple parts that can each be driven independently of one another. However, doing so can more than double the number of elements in the pixel array that must be individually addressed during display updates. Such solutions therefore require extensive changes to the display controller circuitry and its corresponding software.

Accordingly, the invention described herein overcomes the shortcomings of the prior art by providing inventive multi-element display pixel electrode layouts that do not require a complete redesign of the display controller circuitry and corresponding software. Further, the invention described herein provides display pixel drive circuits capable of mitigating the performance variation of electrophoretic displays that occurs due to changes in ambient temperature. In addition, the invention described herein includes temperature compensation methods that use a full or partial display pixel electrode to drive each pixel.

In one aspect, the invention features an electro-optic display including a first subpixel electrode and a second subpixel electrode associated with a display pixel, and an electrophoretic display medium disposed between a common electrode and the first and second subpixel electrodes. The electro-optic display also includes a display controller circuit in electrical communication with the common electrode and a first transistor associated with the display pixel. The display controller circuit is capable of applying waveforms to the display pixel by applying one or more time-dependent voltages between the common electrode and the first subpixel electrode via the first transistor, where the one or more time-dependent voltages are applied to the first subpixel electrode. The electro-optic display also includes a second transistor in electrical communication with the first subpixel electrode and the second subpixel electrode. A first enable signal activates the second transistor to place the first subpixel electrode and the second subpixel electrode into electrical communication.

In some embodiments, the electro-optic display includes a temperature sensor disposed proximate to the electrophoretic display medium. In some embodiments, the first enable signal activates the second transistor based on a measurement of ambient temperature from the temperature sensor. In some embodiments, the temperature sensor controls the first enable signal to activate the second transistor based on a measurement of ambient temperature.

In some embodiments, the electro-optic display includes a third transistor in electrical communication with the second subpixel electrode and the common electrode. In some embodiments, a second enable signal activates the third transistor to drain a remnant charge from the second subpixel electrode. In some embodiments, the second enable signal is controlled by a row selection signal associated with a row of display pixels, and the display pixel is not a display pixel of the row of display pixels.

In some embodiments, the electro-optic display includes a physical gap between the first subpixel electrode and the second subpixel electrode. In some embodiments, the electro-optic display includes a physical gap between at least one adjacent edge of the first and second subpixel electrodes.

In some embodiments, the electro-optic display includes a third transistor in electrical communication with the common electrode and a fourth transistor, and the fourth transistor is in electrical communication with the second subpixel electrode. In some embodiments, the first enable signal deactivates the fourth transistor when the second transistor is activated. In some embodiments, a second enable signal activates the third transistor to drain a remnant charge from the second subpixel electrode. In some embodiments, the second enable signal is controlled by a row selection signal associated with a row of display pixels, and the display pixel is not a display pixel of the row of display pixels.

In another aspect, the invention features an electro-optic display including a first subpixel electrode and a second subpixel electrode associated with a display pixel, and an electrophoretic display medium disposed or electrically coupled between a common electrode and the first and second subpixel electrodes. The electro-optic display also includes a display controller circuit in electrical communication with the common electrode and a first transistor associated with the display pixel. The display controller circuit capable of applying waveforms to the display pixel by applying one or more time-dependent voltages between the common electrode and the first subpixel electrode via the first transistor, where the one or more time-dependent voltages are applied to the first subpixel electrode. The electro-optic display also includes a second transistor in electrical communication with the first subpixel electrode and a third transistor. The third transistor is in electrical communication with the second subpixel electrode, and a row selection signal associated with the display pixel activates the first transistor and the second transistor to place the first subpixel electrode into electrical communication with the third transistor.

In some embodiments, the electro-optic display further includes a temperature sensor disposed proximate to the electrophoretic display medium. In some embodiments, a second enable signal activates the third transistor. In some embodiments, the second enable signal is pulsed at a predetermined rate when the first transistor and the second transistor are activated. In some embodiments, the third transistor is activated for a subset of the time the first transistor and the second transistor are activated.

In some embodiments, the electro-optic display includes a physical gap between the first subpixel electrode and the second subpixel electrode. In some embodiments, the electro-optic display includes a physical gap between at least one adjacent edge of the first and second subpixel electrodes.

These and other aspects of the present invention will be apparent in view of the following description.

BRIEF DESCRIPTION OF DRAWINGS

Additional details of one or more embodiments of the subject matter described in this specification are set forth in the accompanying drawings and the description below. Other features, aspects, and advantages of the subject matter will become apparent from the descriptions contained herein and the accompanying drawings. The drawings are not necessarily to scale and elements of similar structures are generally annotated with like reference numerals for illustrative purposes throughout the drawings. However, the specific properties and functions of elements in different embodiments may not be identical. Further, the drawings are only intended to facilitate the description of the subject matter. The drawings do not illustrate every aspect of the described embodiments and do not limit the scope of the present disclosure or claims.

DETAILED DESCRIPTION OF THE INVENTION

Figure 2:
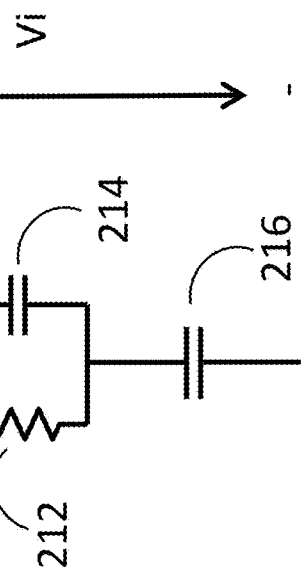
FIG. 2 shows a circuit model of the electro-optic imaging layer in accordance with the subject matter described herein.

The present invention relates to display pixel circuits and methods for driving electro-optic displays, especially bistable electro-optic displays, and to apparatuses for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may and often do, have internal liquid-or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R.A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564.
(h) Applications of displays; see for example U.S. Pat. Nos. 7,312,784; 8,009,348;
(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and
(j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, U.S. Pat. Nos. 6,130,774 6,172,798, 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or display pixel electrode, which addresses one display pixel, is connected to an appropriate voltage source through the associated non-linear element. When the non-linear element is a transistor, the display pixel electrode may be connected to the drain of the transistor, and this arrangement will be assumed in the following description, although it is essentially arbitrary and the display pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display. The term "remnant voltage" is also sometimes used as a term of convenience referring to an overall phenomenon. However, the basis for the switching behavior of impulse-driven electro-optic displays is the application of a voltage impulse (the integral of voltage with respect to time) across the electro-optic medium. Remnant voltage may reach a peak value immediately after the application of a driving pulse, and thereafter may decay substantially exponentially. The persistence of the remnant voltage for a significant time period applies a "remnant impulse" to the electro-optic medium, and strictly speaking this remnant impulse, rather than the remnant voltage, may be responsible for the effects on the optical states of electro-optic displays normally considered as caused by remnant voltage. This remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible.

"Edge ghosting" is another type of ghosting in which an outline (edge) of a portion of a previous image remains visible. This type of artifact is caused by an inter-pixel effect so-called "blooming." For example, in both monochrome and color systems there is a tendency for the electric field generated by a display pixel electrode to affect an area of the electro-optic medium wider than that of the display pixel electrode itself so that, in effect, one pixel's optical state spreads out into parts of the areas of adjacent pixels. Further, in some instances driving adjacent pixels brings about a final optical state in the area between the pixels that differs from the optical state reached by either of the adjacent pixels themselves. This final optical state in the area between the adjacent pixels is caused by an electric field experienced in the inter-pixel region that is the average of the electric fields applied to the adjacent pixels. It has been found that edge ghosting can be mitigated by driving the electro-optic display with DC imbalanced waveforms. However, as discussed above, the DC imbalanced waveforms may produce a remnant voltage.

To summarize, remnant voltage as a phenomenon can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage. Thus, discharging a remnant voltage of an electro-optic display may improve the quality of the displayed image, even in circumstances where the remnant voltage is already low.

Figure 1:
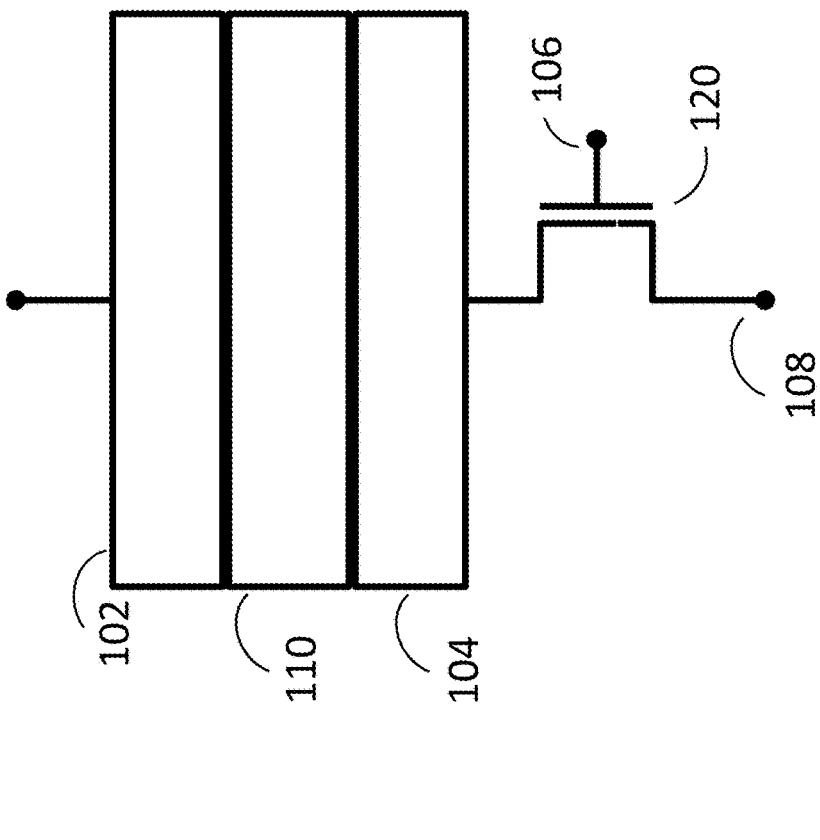
FIG. 1 is a circuit diagram representing an electrophoretic display in accordance with the subject matter described herein.

FIG. 1 shows a schematic of a pixel 100 of an electrophoretic display or EPD in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to the same column electrode, and the driver electrodes 106 of all the pixels in each row may be connected to the same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3:
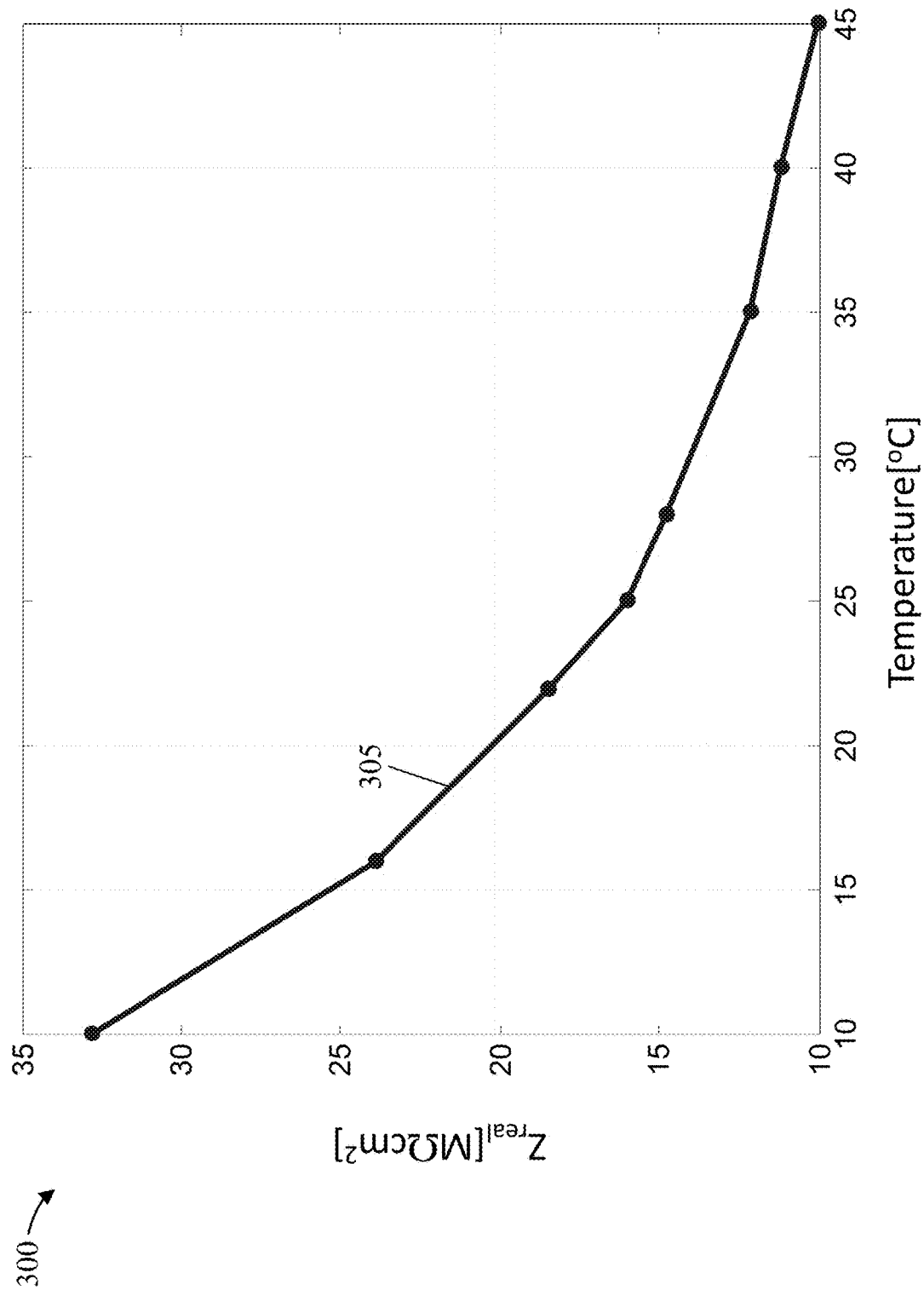
FIG. 3 is a graph showing a plot of the impedance of an exemplary front plane laminate or "FPL" versus temperature in accordance with the subject matter described herein.

It has been observed that the performance of an electrophoretic display can vary according to environmental conditions. For example, variations in the impedance of the FPL can be correlated to fluctuations in temperature. FIG. 3 is a graph 300 showing a plot 305 of the impedance of an exemplary front plane laminate versus temperature. In particular, graph 300 shows a plot 305 of the FPL impedance $Z_{real}$ in $M\Omega cm^2$ at 10 Hz on the Y-axis versus temperature in Celsius on the x-axis. As illustrated by graph 300, FPL impedance decreases as temperature increases. It should be appreciated that the FPL referred to herein may include, but is not limited to, an electrophoretic display's light transmissive electrically conductive layer, a layer of an electro-optic medium, and an adhesive layer.

Figure 4:
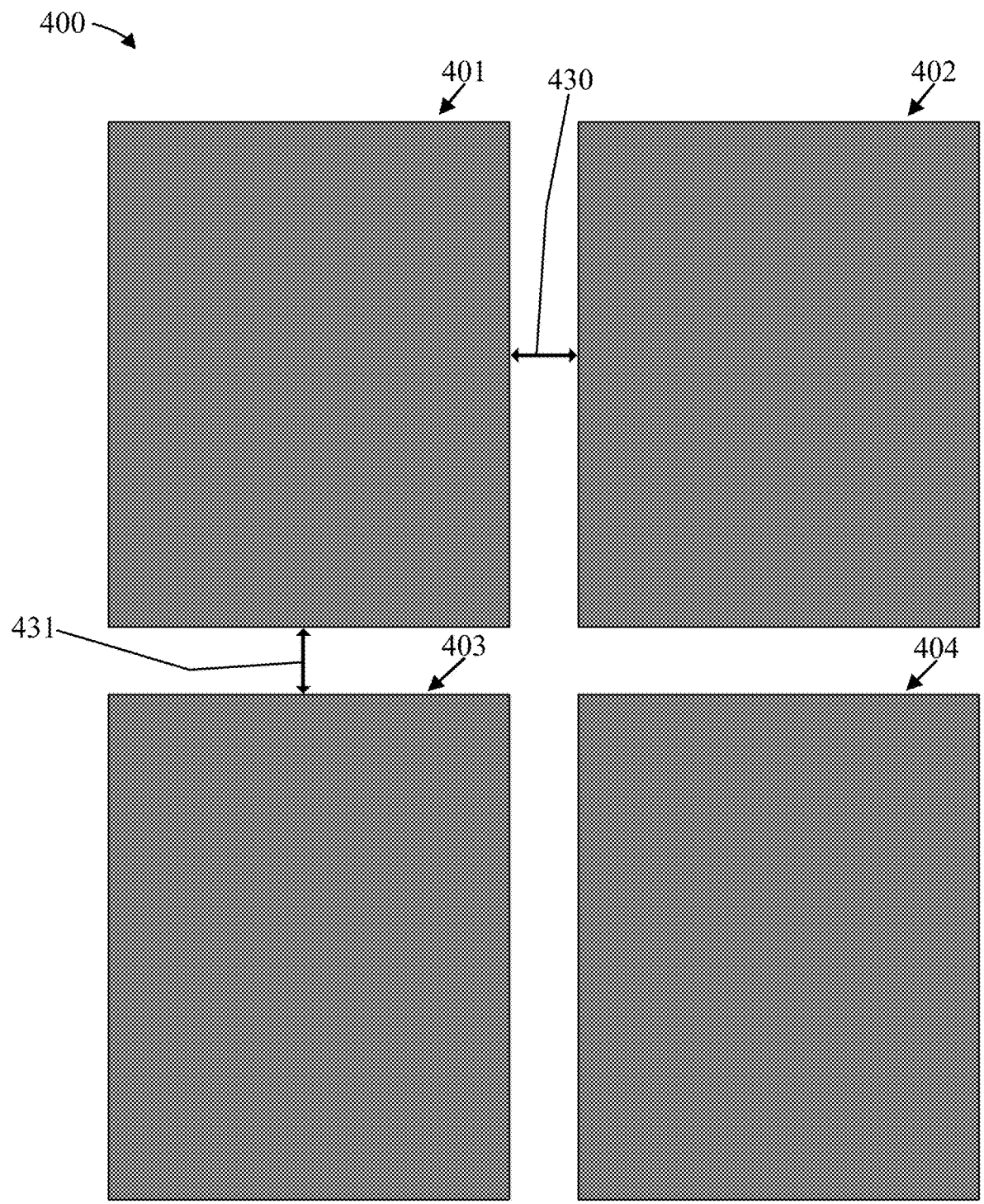
FIG. 4 is a diagram of an exemplary layout of four display pixel electrodes of a conventional display where each display pixel electrode comprises a single conductive pad or contact in accordance with the subject matter described herein.

Conventionally, for an electrophoretic display including a plurality or matrix of display pixels, there is only one display pixel electrode associated with each display pixel. For example, as described above, each display pixel of an active matrix is typically associated with a discrete transistor configured to drive the display pixel by applying one or more voltages to a display pixel electrode comprising a single conductive pad or contact. FIG. 4 is a diagram 400 of an exemplary layout of four display pixel electrodes (display pixel electrode 401, display pixel electrode 402, display pixel electrode 403, and display pixel electrode 404) of a conventional display where each display pixel electrode comprises a single conductive pad or contact.

As shown in FIG. 4, display pixel electrode 401 is spaced a distance 430 from laterally-adjacent display pixel electrode 402. Although not expressly called out in FIG. 4, display pixel electrode 403 is also spaced a distance 430 from laterally-adjacent display pixel electrode 404. Further, display pixel electrode 401 is spaced a distance 431 from vertically-adjacent display pixel electrode 403. Although not expressly called out in FIG. 4, display pixel electrode 402 is also spaced a distance 431 from vertically-adjacent display pixel electrode 404. In some embodiments, distance 430 and distance 431 are substantially equal.

Electrophoretic displays may include circuitry for estimating the impedance of the FPL based on one or more measurements of ambient temperature. Conventional solutions have sought to mitigate undesirable optical artifacts by simply adjusting the voltage applied to the display pixels in response to a temperature measurement. The conventional solution is unsuitable for electrophoretic displays which have unique characteristics at different temperature ranges that cannot be compensated for using voltage adjustment alone. Other conventional solutions utilize display pixel electrodes that are split into multiple sections that can be individually addressed by a display controller. However, such solutions more than double the number of elements in the pixel array that must be managed and controlled during display updates, and therefore add complexity and require extensive changes to the conventional display controller circuitry (to integrated circuits and printed circuit board routing) and its corresponding software. Further, using such a solution for an electrophoretic display can lead to panel degradation due to a mismatch in the kickback voltage associated with each driving element.

Accordingly, as describe in detail below in reference to FIGS. 5-12, the invention described herein overcomes the shortcomings of the prior art by providing inventive multi-element display pixel electrode layouts and related drive circuits that do not require a complete redesign of the display controller circuitry and corresponding software.

Figure 5:
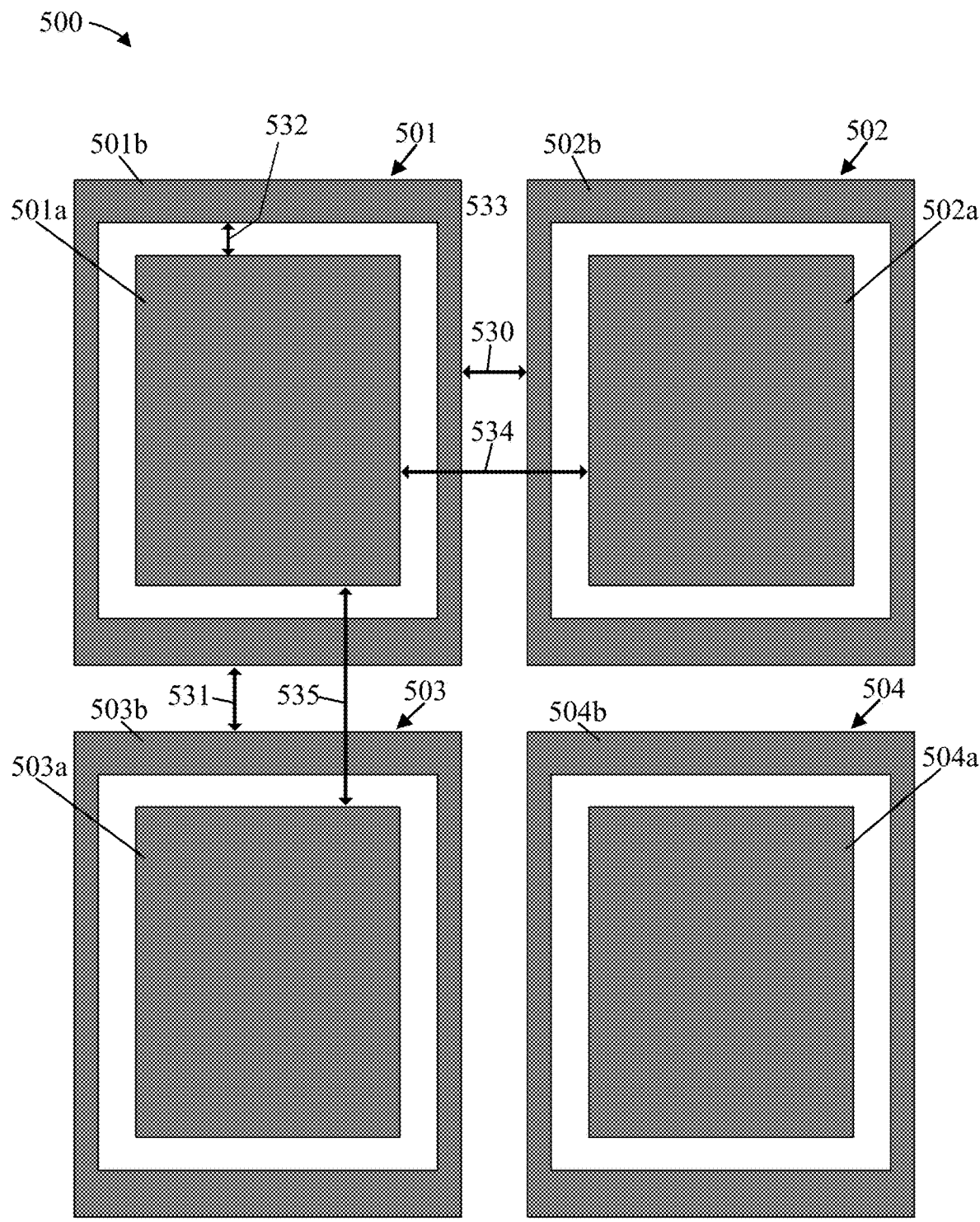
FIG. 5 is a diagram of an exemplary layout of four display pixel electrodes where each display pixel electrode is divided into multiple subpixel electrodes in accordance with the subject matter described herein.

FIG. 5 is a diagram 500 of an exemplary layout of four display pixel electrodes (display pixel electrode 501, display pixel electrode 502, display pixel electrode 503, and display pixel electrode 504) where each display pixel electrode is divided into multiple subpixel electrodes. As shown in FIG. 5, display pixel electrode 501 includes a solid rectangular subpixel electrode 501a (e.g., a first subpixel electrode) at its center surrounded by a hollow rectangular subpixel electrode 501b (e.g., a second subpixel electrode). There is a gap 532 (e.g., a physical gap) between the edges of subpixel electrode 501a and the inner edges of subpixel electrode 501b (e.g., a physical gap between adjacent edges). For example, subpixel electrode 501a and subpixel electrode 501b can each be conductive pads or contacts that are formed on a substrate or backplane such that their edges are spaced apart by some distance (e.g., between 0.5 mil and 1 mil, between 1 mil and 2 mils, between 2 mils and 5 mils, between 5 mils and 50 mils, between 1 mm and 5 mm). In some embodiments, gap 532 is a uniform distance around the perimeter of subpixel electrode 501a. In some embodiments, the length of gap 532 varies between the horizontal direction (e.g., a physical gap in a horizontal direction) and the vertical direction (e.g., a physical gap in a vertical direction).

As shown in FIG. 5, subpixel electrode 501b is spaced a distance 530 from laterally-adjacent subpixel electrode 502b. Although not expressly called out in FIG. 5, subpixel electrode 503b is also spaced a distance 530 from laterally-adjacent subpixel electrode 504b. Further, subpixel electrode 501b is spaced a distance 531 from vertically-adjacent subpixel electrode 503b. Although not expressly called out in FIG. 5, subpixel electrode 502b is also spaced a distance 531 from vertically-adjacent subpixel electrode 504b. In some embodiments, distance 530 and distance 531 are substantially equal.

When used in conjunction with one of the display pixel drive circuits described in detail below, the multi-element display pixel electrode layout shown in FIG. 5 enables each hollow rectangular subpixel electrode to be selectively driven or taken out of circuit independent of its associated solid rectangular subpixel electrode. For example, the hollow subpixel electrode can be selectively taken out of circuit (e.g., floated, grounded, connected to $V_{COM}$) such that a driving waveform applied to a pixel electrode is only applied to its central rectangular subpixel electrode. This effectively increases the distance between the electrodes that are applying a voltage to the electro-optic imaging layer. In particular, when subpixel electrodes 501b and 502b are out of circuit, the lateral distance between pixel electrodes 501 and 502 effectively increases to distance 534, which is the distance between subpixel electrode 501a and subpixel electrode 502a. Similarly, when subpixel electrodes 501b and 503b are out of circuit, the vertical distance between display pixel electrodes 501 and 503 effectively increases to distance 535, which is the distance between subpixel electrode 501a and subpixel electrode 503a.

It has been observed that temperature-induced display artifacts such as lateral coupling and blooming are typically most-pronounced during periods of high temperature when the impedance of the FPL has decreased and a voltage waveform applied to the electrode of one display pixel is most likely to undesirably impact the optical state of neighboring display pixels. The multi-element display pixel electrode layout of diagram 500 and the pixel drive circuits described below enable a drive scheme that can effectively compensate for fluctuations in FPL temperature. For example, selectively taking some or all of the hollow subpixel electrodes out of circuit during periods of high temperature, thereby increasing the distance between the driven portions of the display pixel electrodes, can reduce or eliminate temperature-induced display artifacts.

Figure 6:
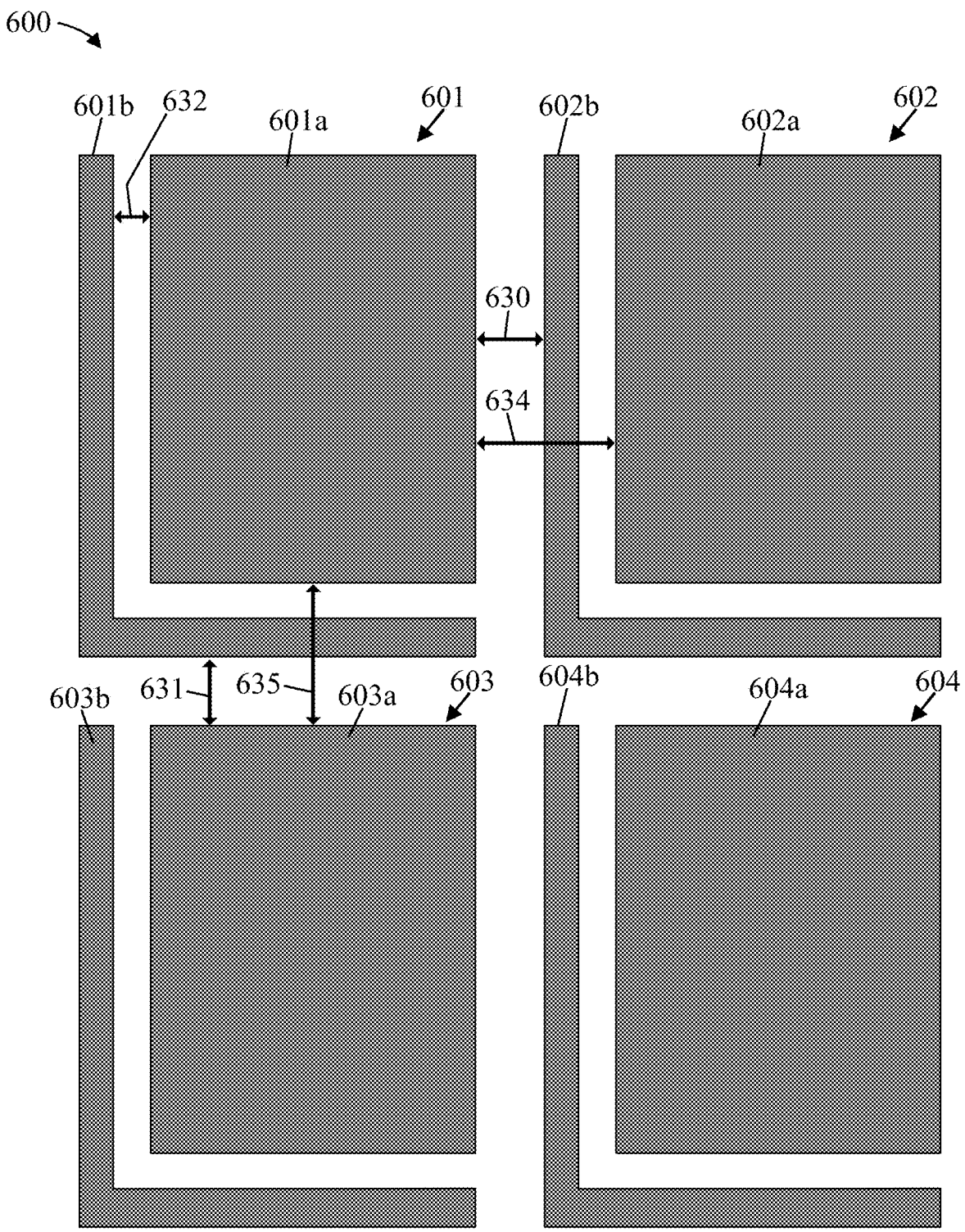
FIG. 6 is a diagram of an exemplary layout of four display pixel electrodes where each display pixel electrode is divided into multiple subpixel electrodes in accordance with the subject matter described herein.

FIG. 6 is a diagram 600 of an exemplary layout of four display pixel electrodes (display pixel electrode 601, display pixel electrode 602, display pixel electrode 603, and display pixel electrode 604) where each display pixel electrode is divided into multiple subpixel electrodes. As shown in FIG. 6, display pixel electrode 601 includes a rectangular subpixel electrode 601a (e.g., a first subpixel electrode) with an L-shaped subpixel electrode 601b (e.g., a second subpixel electrode) positioned adjacent to its left-hand and bottom edges. There is a gap 632 between the edges of subpixel electrode 601a and the inner edges of subpixel electrode 601b. In some embodiments, gap 632 is a uniform distance along the entire inner edge of L-shaped subpixel electrode 601b. In some embodiments, the length of gap 632 varies between the horizontal and vertical directions. In some embodiments, L-shaped subpixel electrode 601b is rotated 180 degrees clockwise and is positioned adjacent to the right-hand and bottom edges of subpixel electrode 601a. One of skill in the art will appreciate that other subpixel electrode configurations are within the scope of the present disclosure.

As shown in FIG. 6, subpixel electrode 601a is spaced a distance 630 from laterally-adjacent subpixel electrode 602b. Although not called out in FIG. 6, subpixel electrode 603a is also spaced a distance 630 from laterally-adjacent subpixel electrode 604b. Further, subpixel electrode 601b is spaced a distance 631 from vertically-adjacent subpixel electrode 603a. Although not called out in FIG. 6, subpixel electrode 602b is also spaced a distance 631 from vertically-adjacent subpixel electrode 604a. In some embodiments, distance 630 and distance 631 are substantially equal.

The multi-element display pixel electrode layout of diagram 600 can also be used with the pixel drive circuits described below for implementing a temperature compensating drive scheme that reduces or eliminates temperature-induced display artifacts. Further, the L-shaped subpixel electrode configuration simplifies the layout and fabrication of the plurality of display pixel electrodes and their associated drive circuits. For example, because the L-shaped subpixel electrode does not completely surround the corresponding rectangular subpixel electrode, conductive traces can be routed to the rectangular subpixel electrode without requiring vias to be drilled and conductively-plated for connecting to traces on a different layer of the substrate or backplane. For similar reasons, placement and routing of the additional display pixel drive circuit components is simplified by this configuration.

As indicated above, the present disclosure includes a number of inventive display pixel drive circuits that can be used in conjunction with the multi-element display pixel electrode layouts described herein to implement temperature-compensating drive schemes for electro-optic displays. The configuration of each drive circuit varies depending on the preferred voltage and drive characteristics for the subpixel electrodes.

Figure 7:
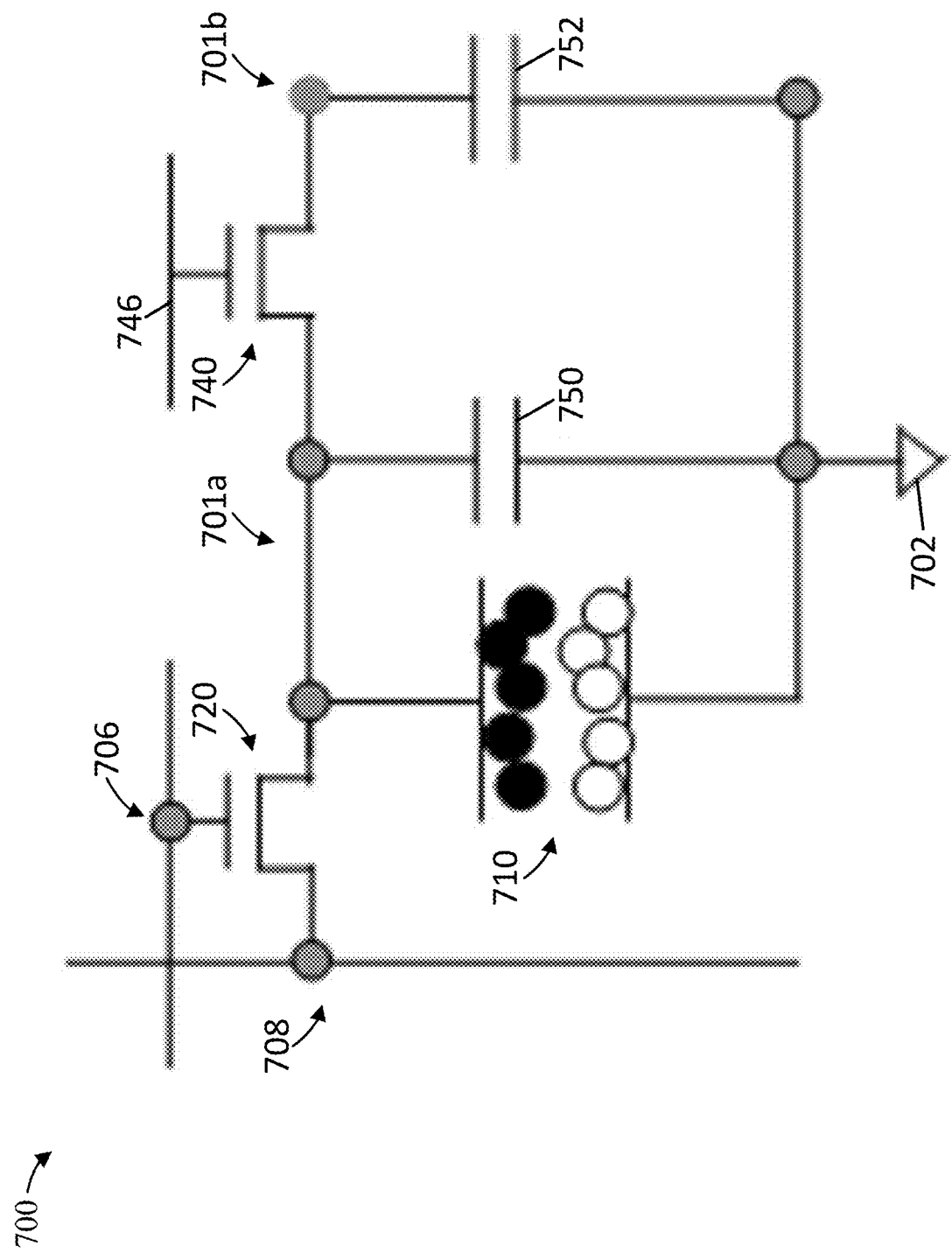
FIG. 7 is a schematic diagram of an exemplary pixel comprising a display pixel drive circuit in accordance with the subject matter described herein.

FIG. 7 is a schematic diagram of an exemplary pixel 700 comprising a display pixel drive circuit according to the subject matter described herein. As in conventional displays, display pixel 700 includes a transistor 720 (e.g., a first transistor) that applies the voltage (e.g., the time-dependent voltages) present on addressing electrode 708 to the display pixel electrode (in this case, subpixel electrode 701*a*) when a gate voltage sufficient to activate the transistor 720 is applied to driver electrode 706. For example, driver electrode 706 can be connected to the row selection circuitry of a display controller or driver. The voltage applied to the addressing electrode 708 can be relative to the voltage applied to the $V_{COM}$ or front-plate electrode 702 (e.g., a common electrode). The voltage applied to the front-plate electrode 702 is typically a voltage of approximately zero volts, but is not limited as such and can be a positive or negative voltage. A storage capacitor 750 (e.g., a first storage capacitor) maintains the voltage across the electro-optic medium 710 (e.g., an electrophoretic display medium) in between updates.

As illustrated in FIG. 7, different from a conventional pixel design, display pixel 700 includes a transistor 740 (e.g., a second transistor) between subpixel electrode 701*a* (e.g., a first subpixel electrode) and subpixel electrode 701*b* (e.g., a second subpixel electrode) to enable display pixel 700 to operate in high and low temperature modes. For example, when temperatures are low, a voltage sufficient to activate the transistor 720 is applied to the enable signal 746 (e.g., a first enable signal) which drives the gate signal of transistor 740. Transistor 740 becomes conductive in the activated state, and subpixel electrode 701*a* and subpixel electrode 701*b* are then electrically connected. Accordingly, the voltage applied to the addressing electrode 708 is applied to both subpixel electrode 701*a* and subpixel electrode 701*b*. An additional storage capacitor 752 (e.g., a second storage capacitor) also maintains the voltage across the electro-optic medium 710 in between updates when transistor 740 is activated.

Conversely, when the temperature is high and the FPL impedance drops, the enable signal 746 can be set to a low state to deactivate transistor 740, thereby placing the subpixel electrode 701*b* in a high impedance (e.g., floating, non-conductive) state and precluding the voltage applied to subpixel electrode 701*a* from also being applied to subpixel electrode 701*b*. As described above, when using a multi-element display pixel electrode such as those shown in FIG. 5 and FIG. 6, selectively taking subpixel electrode 701*b* out of circuit during periods of high temperature increases the distance between the driven portions of the display pixel electrodes, and can reduce or eliminate temperature-induced display artifacts.

Figure 12:
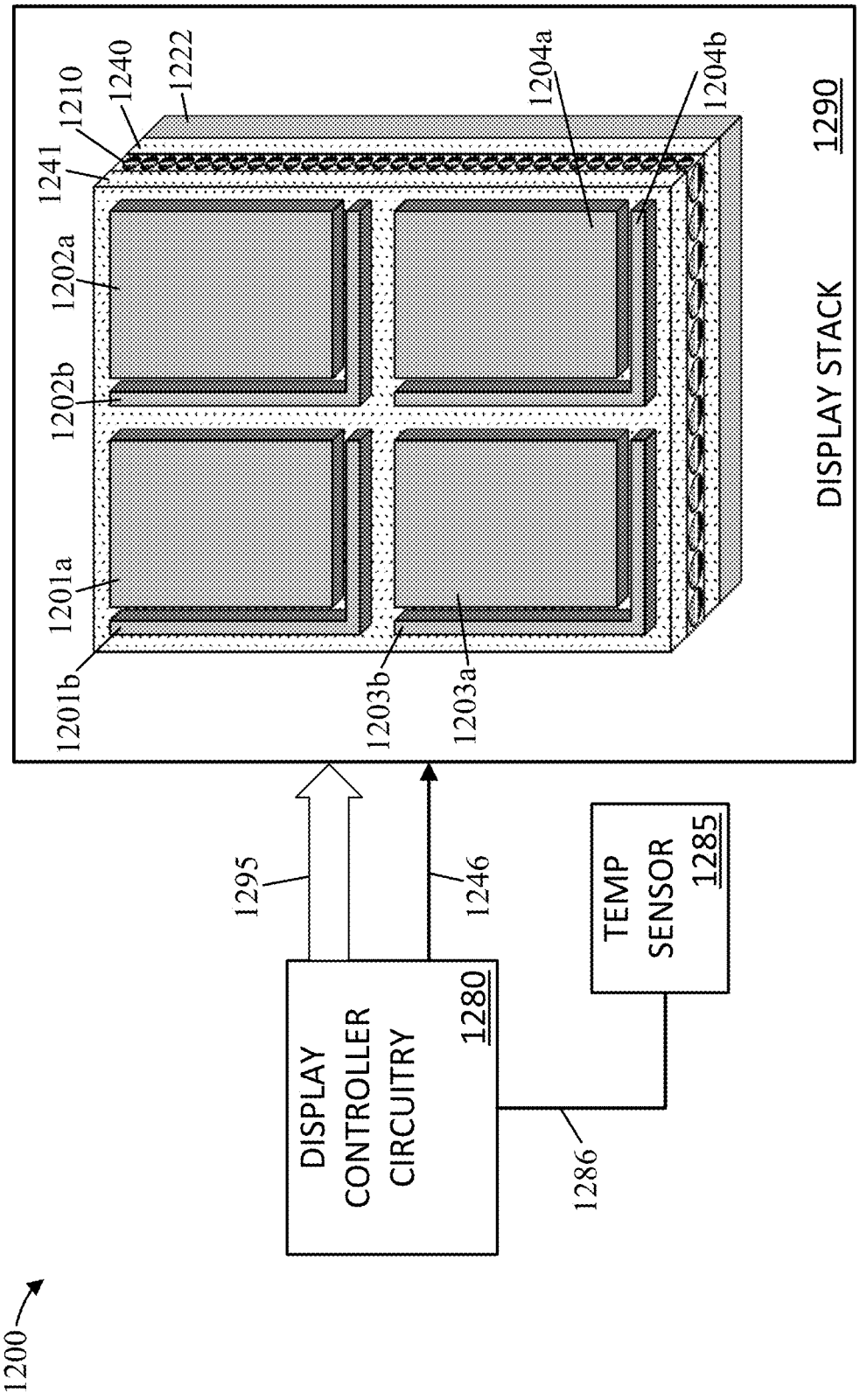
FIG. 12 is a block diagram of an exemplary electrophoretic display in accordance with the subject matter described herein.

FIG. 12 is a block diagram of an exemplary electrophoretic display 1200 in accordance with the subject matter described herein. The electrophoretic display 1200 includes display controller circuitry 1280, a display stack 1290, and a temperature sensor 1285.

The display stack 1290 includes a front-plate or common electrode 1222, an imaging film 1210, and an array of four display pixel electrodes, with each display pixel electrode being divided into multiple subpixel electrodes: display pixel electrode 1201 including subpixel electrode 1201*a* and subpixel electrode 1201*b*, display pixel electrode 1202 including subpixel electrode 1202*a* and subpixel electrode 1202*b*, display pixel electrode 1203 including subpixel electrode 1203*a* and subpixel electrode 1203*b*, and display pixel electrode 1204 including subpixel electrode 1204*a* and subpixel electrode 1204*b*. The subpixel electrodes of each display pixel electrode shown in FIG. 12 are similar to those shown in FIG. 6 where one subpixel electrode is rectangular, and the other subpixel electrode is L-shaped. One of skill in the art will appreciate that other subpixel electrode configurations are within the scope of the present disclosure. Further, one of skill in the art will appreciate that the present invention is not limited to electro-optic displays having four display pixel electrodes.

The common electrode 1222 can be formed of any suitable conductive transparent material, including, without limitation, aluminum indium tin oxide (ITO). The imaging film 1210 can include, without limitation, an encapsulated electrophoretic imaging film, which may include, for example, charged pigment particles. The electrophoretic display 1200 is typically viewed from the common electrode 1222 side as opposed to the display pixel electrodes 1201-1204 side. However, the components of electrophoretic display 1200 can be chosen such that the electrophoretic display 1200 is viewable from the display pixel electrodes 1201-1204 side, or even from either side.

The display stack 1290 also includes adhesive layer 1240 between the common electrode 1222 and the imaging film 1210, and adhesive layer 1241 between the imaging film 1210 and the display pixel electrodes 1201-1204. In some embodiments the adhesive layers can include an integrated primer component to improve adhesion, or a separate primer layer (not shown in FIG. 12) can be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.)

Although not shown in FIG. 12, display stack 1290 can include one or more additional layers as needed. As one example, the display pixel electrodes 1201-1204 can be a component of a backplane that includes a substrate layer onto which the display pixel electrodes 1201-1204 are disposed. Further, the common electrode 1222 can be disposed on a substrate layer such as a poly(ethylene terephthalate) (PET) film, available commercially, for example, as "aluminized Mylar" ("Mylar" is a Registered Trade Mark of E.I. du Pont de Nemours & Company, Wilmington DE).

The display controller circuitry 1280 represents the circuits and components that provide the supply voltages and control signals 1295 necessary to operate the electrophoretic display 1200. For example, the display controller circuitry 1280 can include power management circuitry for generating and supplying multiple voltages to the display stack 1290 along with row and column drivers for addressing the array of display pixel electrodes and driving waveforms sufficient to change the optical state of the imaging film 1210. In some embodiments, the transistors used for addressing and driving the display pixel electrodes are positioned in proximity to the array of display pixel electrodes.

The display controller circuitry 1280 also controls the state of enable signal 1246, which corresponds to enable signal 746 described in connection with FIG. 7 above.

Although not shown in FIG. 12, the display controller circuitry 1280 can be configured to also control the states of additional enable signals used in the embodiments described below in connection with FIGS. 8-10.

One of skill in the art will appreciate that the display controller circuitry 1280 of the present invention can be implemented in a number of different physical forms and can utilize a variety of analog and digital components. For example, the display controller circuitry 1280 can include a general purpose microprocessor in conjunction with appropriate peripheral components (for example, one or more digital-to-analog converters, "DACs") to convert the digital outputs from the microprocessor to appropriate voltages for application to pixels. Alternatively, the display controller circuitry 1280 can be implemented in an application specific integrated circuit ("ASIC") or field programmable gate array ("FPGA"). One of skill in the art will appreciate that the display controller circuitry 1280 can include both processing components and power management circuitry.

In some embodiments, the display controller circuitry 1280 includes a timing controller integrated circuit ("IC") that accepts incoming image data and outputs control signals to a collection of data and select driver ICs (e.g., row and column driver ICs) in order to produce the proper voltages at the display pixel electrodes to display the desired image. In some embodiments, a host controller in communication with the display controller circuit requests an update to the electrophoretic display 1200 and supplies the image data for the update to the display controller circuit. In some embodiments, the display controller circuitry 1280 accepts the image data through access to a memory buffer that contains the image data, or receives a signal from which the image data is extracted. In some embodiments, the memory buffer has a structure such as those described in U.S. Pat. No. 9,721,495. In some embodiments, the display controller circuitry 1280 receives serial signals containing the information required to perform the necessary calculations to generate drive impulses (e.g., driving waveforms) to apply to the electrophoretic medium during scans of the pixel array.

The temperature sensor 1285 measures the temperature of the electrophoretic medium, or the environment immediately adjacent thereto, and provides temperature information to the display controller circuitry 1280 via interface 1286. In some embodiments, the temperature sensor 1285 is positioned within the encapsulated electrophoretic medium of the imaging film 1210. In some embodiments, the temperature sensor 1285 comprises multiple temperature sensors positioned at different physical locations around or within the imaging film 1210.

The temperature sensor 1285 can be a sensor for which an electric property such as a resistance value or a capacitance value changes in response to fluctuations in temperature. In some embodiments, the temperature sensor 1285 comprises a thermocouple, a resistance temperature detector ("RTD"), and/or a thermistor (e.g., a Negative Temperature Coefficient ("NTC") thermistor). In some embodiments, the temperature sensor 1285 comprises a semiconductor-based integrated circuit for sensing temperature.

In some embodiments, interface 1286 is an integrated bus interface or similar bus interface that the temperature sensor 1285 uses for communicating temperature information to the display controller circuitry 1280. In some embodiments, interface 1286 is a signal that the temperature sensor 1285 outputs to convey the measured temperature. For example, interface 1286 can be a signal that the temperature sensor 1285 is configured to drive high when the measured temperature exceeds a threshold. In some embodiments, the electrophoretic display 1200 is configured such that the temperature sensor 1285 controls the state of the enable signals without intervention from the display controller circuitry 1280.

Referring to FIG. 12 in the context of the circuit shown in FIG. 7, when the temperature in proximity to the electrophoretic medium of imaging film 1210 is low and the occurrence and effects of temperature-induced display artifacts are reduced, the enable signal 1246 is driven to a state that activates the transistor (e.g., transistor 740 of FIG. 7) positioned between subpixel electrode 1201a and subpixel electrode 1201b, thereby connecting them electrically. Accordingly, any voltage applied to subpixel electrode 1201a is also applied to subpixel electrode 1201b. Similarly, the enable signal 1246 activates a transistor positioned between subpixel electrodes 1202a and 1202b, a transistor positioned between subpixel electrodes 1203a and 1203b, and a transistor positioned between subpixel electrodes 1204a and 1204b, thereby electrically connecting each pair of subpixel electrodes, respectively. This configuration effectively increases the overall area of each display pixel electrode and decreases the distance between adjacent display pixel electrodes.

Conversely, when the temperature in proximity to the electrophoretic medium is high and the occurrence and effects of temperature-induced display artifacts are most-pronounced, the enable signal 1246 is driven to a state that deactivates the transistor (e.g., transistor 740 of FIG. 7) positioned between subpixel electrode 1201a and subpixel electrode 1201b, thereby electrically isolating them. Accordingly, voltages applied to subpixel electrode 1201a are not applied to subpixel electrode 1201b. Similarly, the enable signal 1246 deactivates a transistor positioned between subpixel electrodes 1202a and 1202b, a transistor positioned between subpixel electrodes 1203a and 1203b, and a transistor positioned between subpixel electrodes 1204a and 1204b, thereby electrically isolating each pair of subpixel electrodes, respectively. By effectively decreasing the overall area of each display pixel electrode and increasing the distance between adjacent display pixel electrodes, this configuration can reduce or eliminate temperature-induced display artifacts that would otherwise occur at high temperatures. Further, a single enable signal can be used to select the high or low temperature drive scheme, thereby reducing the complexity of a drive scheme using subpixels.

In some embodiments, the array of display pixel electrodes is divided into subgroups (e.g., halves, quadrants, etc.) each comprising a plurality of display pixel electrodes, and there is an enable signal and temperature sensor associated with each subgroup. This allows each subgroup of display pixels to be operated in a low or high temperature mode independent of the other subgroups. For example, a display used for applications such as outdoor signage can have a portion of its surface exposed to direct sunlight while another portion of the surface is mostly shaded. In this case, if the temperature of the electrophoretic medium in the portion of the display exposed to direct sunlight rose above a threshold, the display pixels corresponding to the portion can be operated in a high temperature mode, while the display pixels corresponding to the shaded portion can be operated in a low temperature mode.

Accordingly, FIG. 7 shows an aspect of the invention featuring an electro-optic display including a first subpixel electrode and a second subpixel electrode associated with a display pixel, and an electrophoretic display medium disposed between a common electrode and the first and second subpixel electrodes. In some embodiments, the electro-optic display includes a physical gap between the first subpixel electrode and the second subpixel electrode. In some embodiments, the electro-optic display includes a physical gap between at least one adjacent edge of the first and second subpixel electrodes.

The electro-optic display also includes a display controller circuit in electrical communication with the common electrode and a first transistor associated with the display pixel. The display controller circuit is capable of applying waveforms to the display pixel by applying one or more time-dependent voltages between the common electrode and the first subpixel electrode via the first transistor, where the one or more time-dependent voltages are applied to the first subpixel electrode. The electro-optic display also includes a second transistor in electrical communication with the first subpixel electrode and the second subpixel electrode. A first enable signal activates the second transistor to place the first subpixel electrode and the second subpixel electrode into electrical communication.

As described in connection with FIG. 12, the electro-optic display can include a temperature sensor disposed proximate to the display pixel for measuring a temperature of, or near to, the electrophoretic display medium. In some embodiments, the first enable signal activates the second transistor based on a measurement of ambient temperature from the temperature sensor. In some embodiments, the temperature sensor controls the first enable signal to activate the second transistor based on a measurement of ambient temperature.

Figure 8:
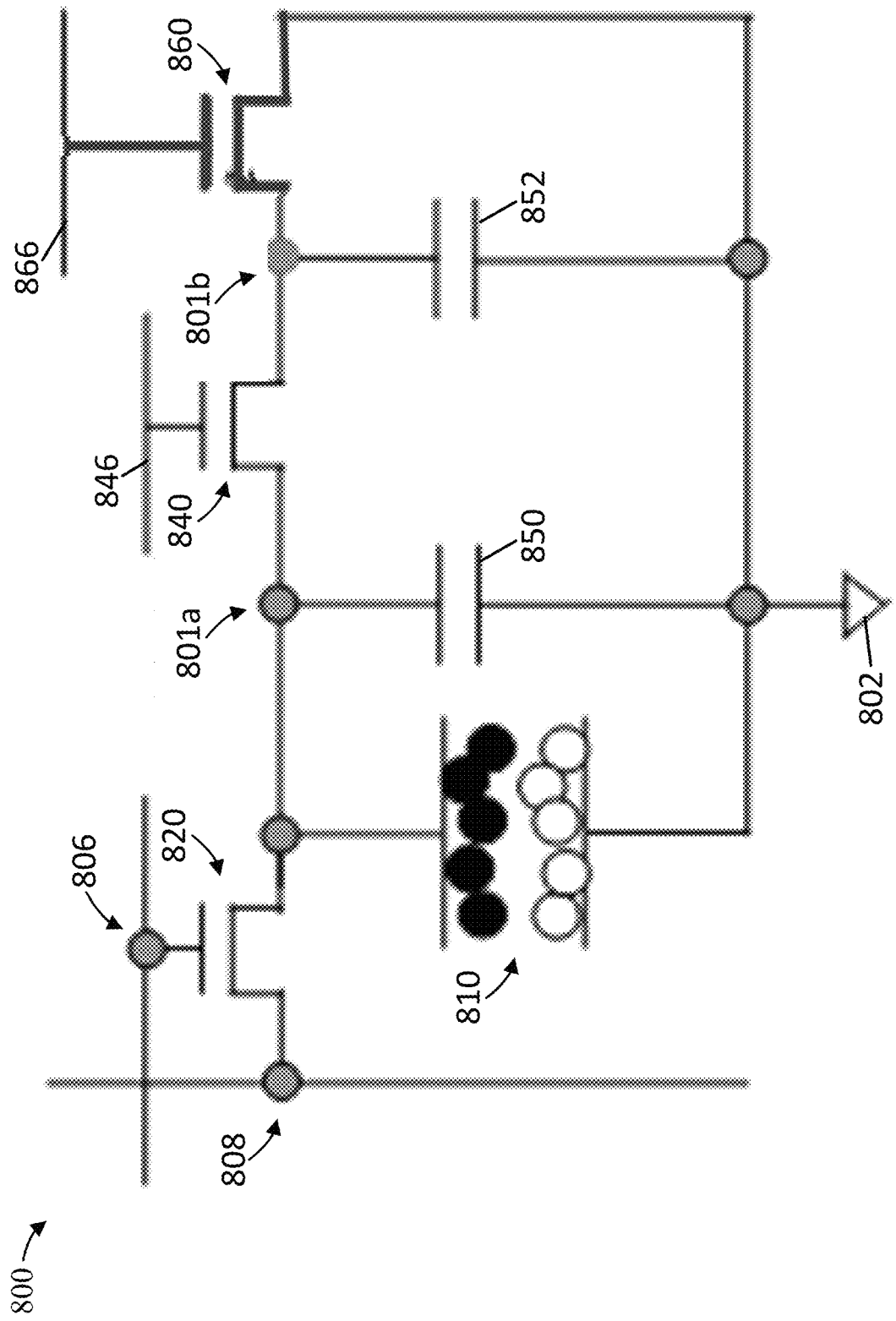
FIG. 8 is a schematic diagram of an exemplary pixel comprising a display pixel drive circuit in accordance with the subject matter described herein.

FIG. 8 is a schematic diagram of another exemplary pixel 800 comprising a display pixel drive circuit according to the subject matter described herein. Pixel 800 is similar to pixel 700, but also includes transistor 860 (e.g., a third transistor) between subpixel electrode 801*b* and the front-plate electrode 802.

This embodiment is configured such that the row selection signal of the previous row of display pixels within the array controls the state of the enable signal 866 (e.g., a second enable signal) that activates or deactivates transistor 860 by controlling the state of the gate signal of transistor 860. As a result, instead of just floating when transistor 840 is deactivated in high temperature mode, subpixel electrode 801*b* is refreshed to the voltage applied to the front-plate electrode 802 during each frame just prior to updating the state of pixel 800.

The addition of transistor 860 is beneficial because it drains remnant charges that may otherwise remain on subpixel electrode 801*b* and lead to undesirable image artifacts such as blooming and shifts in the optical state of the display pixels. For example, subpixel electrode 801*b* can be driven to a certain voltage while the display is in a low temperature mode for which transistor 840 is activated. Without transistor 860, if the display were to enter a high temperature mode prior to its next update, transistor 840 would be deactivated and any charge remaining on subpixel electrode 801*b* would get stored by storage capacitor 852 (e.g., a second storage capacitor), leading to image artifacts discussed above. Because transistor 860 is activated by enable signal 866 during every frame, remnant charges are beneficially drained from subpixel electrode 801*b*, and this configuration advantageously drains remnant voltage regardless of which temperature mode the display is in.

Accordingly, FIG. 8 shows an aspect of the invention featuring an electro-optic display including a first subpixel electrode and a second subpixel electrode associated with a display pixel, and an electrophoretic display medium disposed between a common electrode and the first and second subpixel electrodes. In some embodiments, the electro-optic display includes a physical gap between the first subpixel electrode and the second subpixel electrode. In some embodiments, the electro-optic display includes a physical gap between at least one adjacent edge of the first and second subpixel electrodes.

The electro-optic display also includes a display controller circuit in electrical communication with the common electrode and a first transistor associated with the display pixel. The display controller circuit is capable of applying waveforms to the display pixel by applying one or more time-dependent voltages between the common electrode and the first subpixel electrode via the first transistor, where the one or more time-dependent voltages are applied to the first subpixel electrode.

The electro-optic display also includes a second transistor in electrical communication with the first subpixel electrode and the second subpixel electrode. A first enable signal activates the second transistor to place the first subpixel electrode and the second subpixel electrode into electrical communication. The electro-optic display also includes a third transistor in electrical communication with the second subpixel electrode and the common electrode. In some embodiments, a second enable signal activates the third transistor to drain a remnant charge from the second subpixel electrode. In some embodiments, the second enable signal is controlled by a row selection signal associated with a row of display pixels, and the display pixel is not a display pixel of the row of display pixels.

Similar to the electro-optic display described in connection with FIG. 7, the electro-optic display exemplified in FIG. 8 can include a temperature sensor disposed proximate to the display pixel for measuring a temperature of, or near to, the electrophoretic display medium. In some embodiments, the first enable signal activates the second transistor based on a measurement of ambient temperature from the temperature sensor. In some embodiments, the temperature sensor controls the first enable signal to activate the second transistor based on a measurement of ambient temperature.

Figure 9:
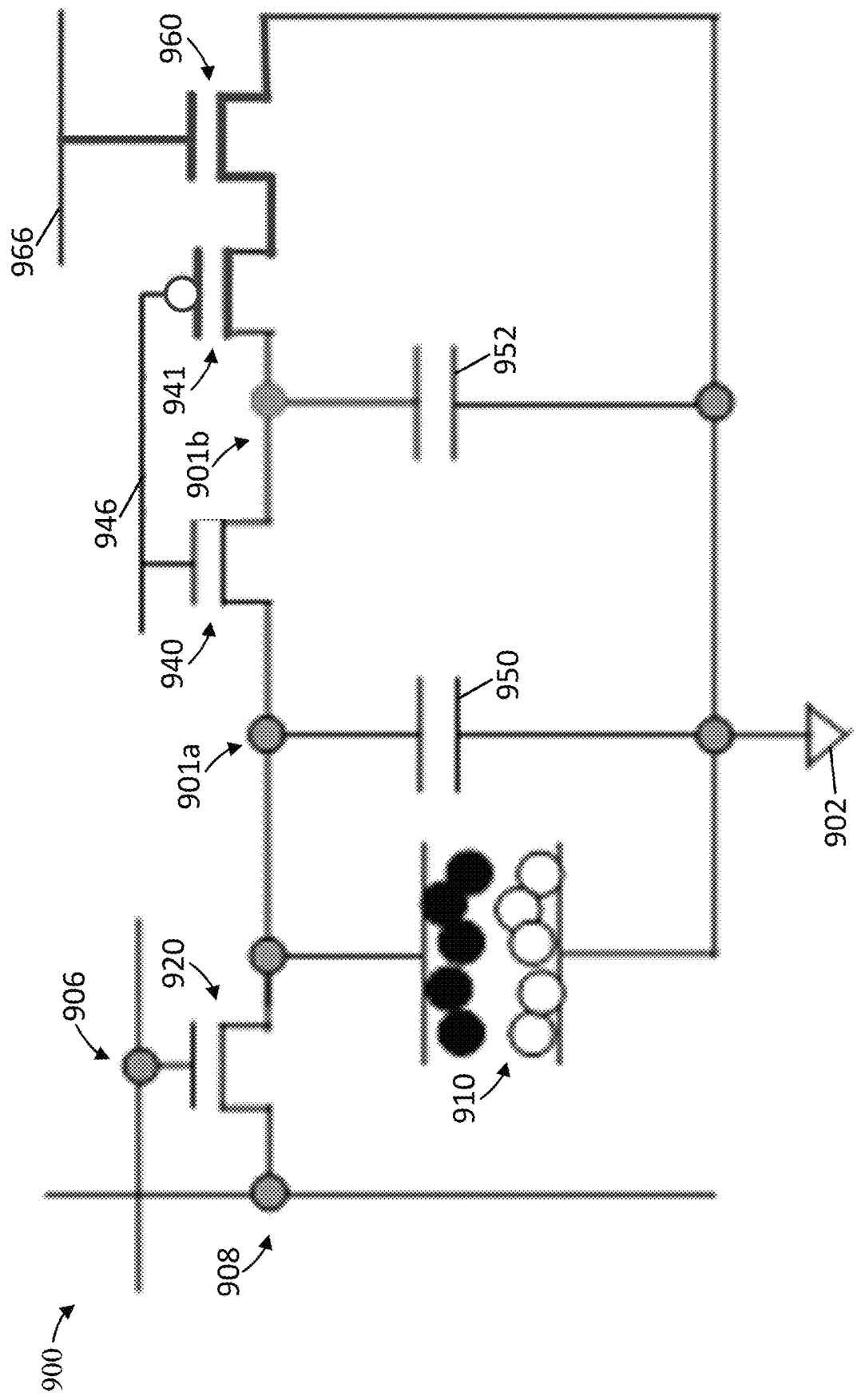
FIG. 9 is a schematic diagram of an exemplary pixel comprising a display pixel drive circuit in accordance with the subject matter described herein.

FIG. 9 is a schematic diagram of another exemplary pixel 900 comprising a display pixel drive circuit according to the subject matter described herein. Pixel 900 is similar to pixel 800, but also includes transistor 941 (e.g., a fourth transistor) between subpixel electrode 901*b* and transistor 960 (e.g., a third transistor). In this embodiment, the enable signal 946 (e.g., a first enable signal) drives the gate signals of both transistor 940 (e.g., a second transistor) and transistor 941, but enable signal 946 is inverted at the gate signal of transistor 941 such that the state of transistor 941 is always opposite to the state of transistor 940. One of skill in the art will appreciate that there is not necessarily a logic inverter circuit between enable signal 946 and the gate signal of transistor 941. For example, in some embodiments, transistor 940 is an n-type transistor and transistor 941 is a p-type transistor.

During operation, when the display is in a low temperature mode, transistor 940 is activated and transistor 941 is deactivated. When the display enters a high temperature mode, the state of enable signal 946 toggles, and transistor 940 is deactivated while transistor 941 is then activated. Accordingly, subpixel electrode 901*b* is refreshed to the voltage applied to the front-plate electrode 902 only when the display is in a high temperature mode. Like display pixel 800, the row selection signal of the previous row of display pixels within the array controls the state of the enable signal 966 that activates or deactivates transistor 960, so the refresh happens during each frame just prior to updating the state of display pixel 900 when the previous row of display pixels is being selected and enable signal 966 activates transistor 960. This solution is useful during high temperature operation when the display controller's post drive discharge routine cannot drain remnant charges from subpixel electrode 901b.

Accordingly, FIG. 9 shows an aspect of the invention featuring an electro-optic display including a first subpixel electrode and a second subpixel electrode associated with a display pixel, and an electrophoretic display medium disposed between a common electrode and the first and second subpixel electrodes. In some embodiments, the electro-optic display includes a physical gap between the first subpixel electrode and the second subpixel electrode. In some embodiments, the electro-optic display includes a physical gap between at least one adjacent edge of the first and second subpixel electrodes.

The electro-optic display also includes a display controller circuit in electrical communication with the common electrode and a first transistor associated with the display pixel. The display controller circuit is capable of applying waveforms to the display pixel by applying one or more time-dependent voltages between the common electrode and the first subpixel electrode via the first transistor, where the one or more time-dependent voltages are applied to the first subpixel electrode.

The electro-optic display also includes a second transistor in electrical communication with the first subpixel electrode and the second subpixel electrode. A first enable signal activates the second transistor to place the first subpixel electrode and the second subpixel electrode into electrical communication. The electro-optic display also includes a third transistor in electrical communication with the common electrode and a fourth transistor, where the fourth transistor is in electrical communication with the second subpixel electrode. In some embodiments, a second enable signal activates the third transistor to drain a remnant charge from the second subpixel electrode. In some embodiments, the first enable signal deactivates the fourth transistor when the second transistor is activated. In some embodiments, a second enable signal activates the third transistor to drain a remnant charge from the second subpixel electrode. In some embodiments, the second enable signal is controlled by a row selection signal associated with a row of display pixels, wherein the display pixel is not a display pixel of the row of display pixels.

Similar to the electro-optic display described in connection with FIGS. 7 and 8, the electro-optic display exemplified in FIG. 9 can include a temperature sensor disposed proximate to the display pixel for measuring a temperature of, or near to, the electrophoretic display medium. In some embodiments, the first enable signal activates the second transistor and deactivates the fourth transistor based on a measurement of ambient temperature from the temperature sensor. In some embodiments, the temperature sensor controls the first enable signal to activate the second transistor and deactivate the fourth transistor based on a measurement of ambient temperature.

Figure 10:
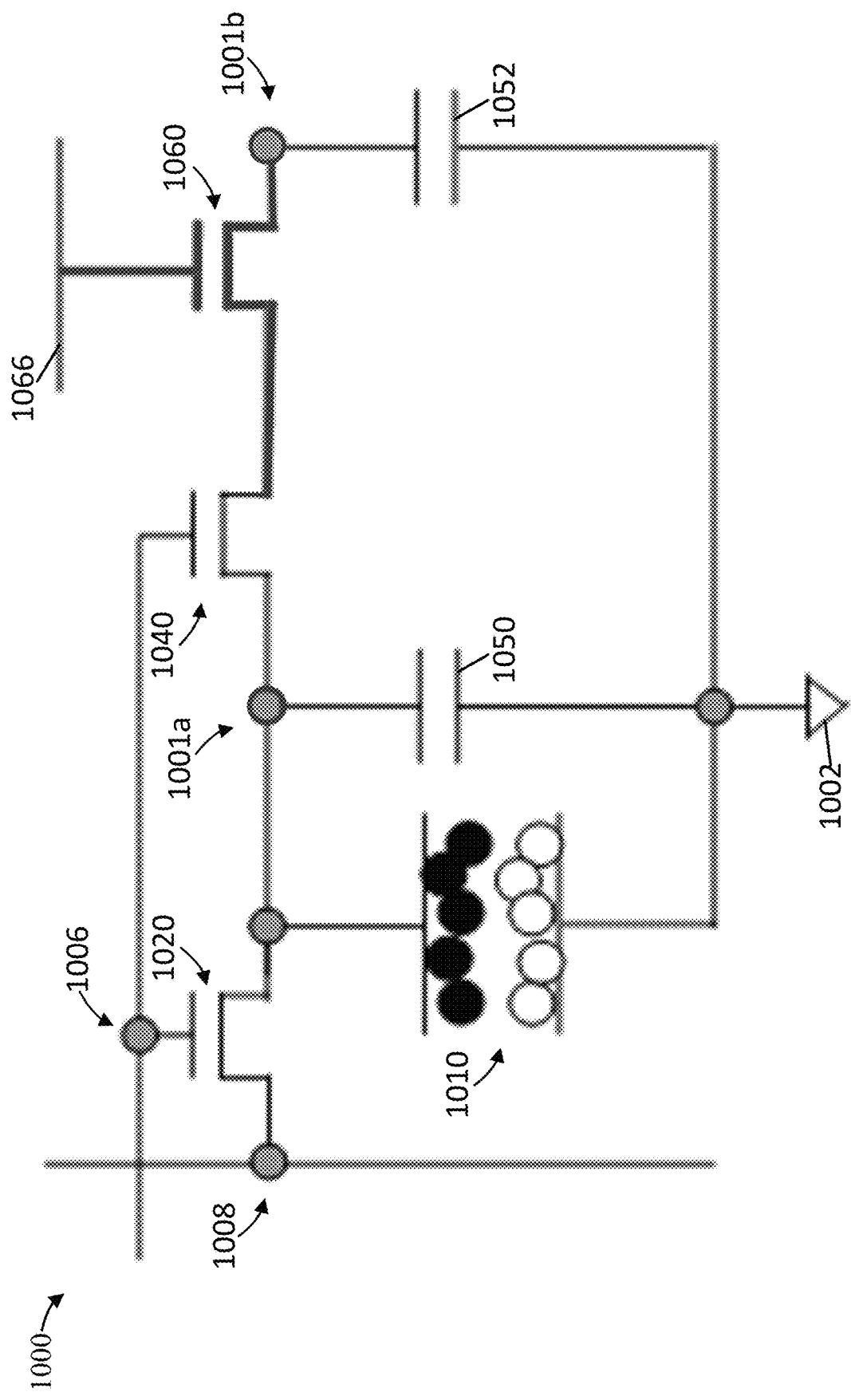
FIG. 10 is a schematic diagram of an exemplary pixel comprising a display pixel drive circuit in accordance with the subject matter described herein.

FIG. 10 is a schematic diagram of another exemplary display pixel 1000 comprising a display pixel drive circuit according to the subject matter described herein. Display pixel 1000 includes many similar elements to the other display pixels described herein such as display pixel 800, but is configured to control the voltage of subpixel electrode 1001b within a certain range when the display is in high temperature mode.

In the configuration shown in FIG. 10, subpixel electrode 1001b (e.g., a second subpixel electrode) and the upper terminal of storage capacitor 1052 (e.g., a second storage capacitor) are not positioned between transistor 1040 (e.g., a second transistor) and transistor 1060 (e.g., a third transistor), as in the configuration of display pixel 800, but are instead connected on the far side of transistor 1060 such that they have no direct connection to transistor 1040. Further, in the display pixel circuit of display pixel 1000 the display controller's row selection logic connected to driver electrode 1006 controls the gate signals of transistor 1020 (e.g., a first transistor) and transistor 1040. Accordingly, the display controller's row selection logic connected to driver electrode 1006 functions analogously to an enable signal (e.g., a first enable signal similar to 746, 846, and 946 from FIGS. 7, 8, and 9, respectively) to transistor 1040. As such, the transistor 1040 gets activated whenever transistor 1020 is activated, and the state of transistor 1060 controls whether or not voltages applied to subpixel electrode 1001a (e.g., a first subpixel electrode) are also applied to subpixel electrode 1001b.

The configuration of display pixel 1000 enables the voltage applied to subpixel electrode 1001b to be controlled within a certain range by modulating the duty ratio and/or amplitude of the enable signal 1066 (e.g., a second enable signal). In some embodiments, the enable signal 1066 can be operated similar to a pulse-width modulation ("PWM") circuit. For example, the enable signal 1066 can be pulsed between the gate-on and gate-off thresholds of transistor 1060, and the frequency and/or duration of the on and off periods can be controlled such that the voltage applied to subpixel electrode 1001b can be regulated.

Accordingly, FIG. 10 shows an aspect of the invention featuring an electro-optic display including a first subpixel electrode and a second subpixel electrode associated with a display pixel, and an electrophoretic display medium disposed or electrically coupled between a common electrode and the first and second subpixel electrodes. In some embodiments, the electro-optic display includes a physical gap between the first subpixel electrode and the second subpixel electrode. In some embodiments, the electro-optic display includes a physical gap between at least one adjacent edge of the first and second subpixel electrodes.

The electro-optic display also includes a display controller circuit in electrical communication with the common electrode and a first transistor associated with the display pixel. The display controller circuit capable of applying waveforms to the display pixel by applying one or more time-dependent voltages between the common electrode and the first subpixel electrode via the first transistor, where the one or more time-dependent voltages are applied to the first subpixel electrode.

The electro-optic display also includes a second transistor in electrical communication with the first subpixel electrode and a third transistor. The third transistor is in electrical communication with the second subpixel electrode, and a row selection signal associated with the display pixel activates the first transistor and the second transistor to place the first subpixel electrode into electrical communication with the third transistor.

In some embodiments, the electro-optic display further includes a temperature sensor disposed proximate to the electrophoretic display medium and/or display pixel. In some embodiments, a second enable signal activates the third transistor. In some embodiments, the second enable signal is pulsed at a predetermined rate when the first transistor and the second transistor are activated. In some embodiments, the third transistor is activated for a subset of the time the first transistor and the second transistor are activated.

Figure 11:
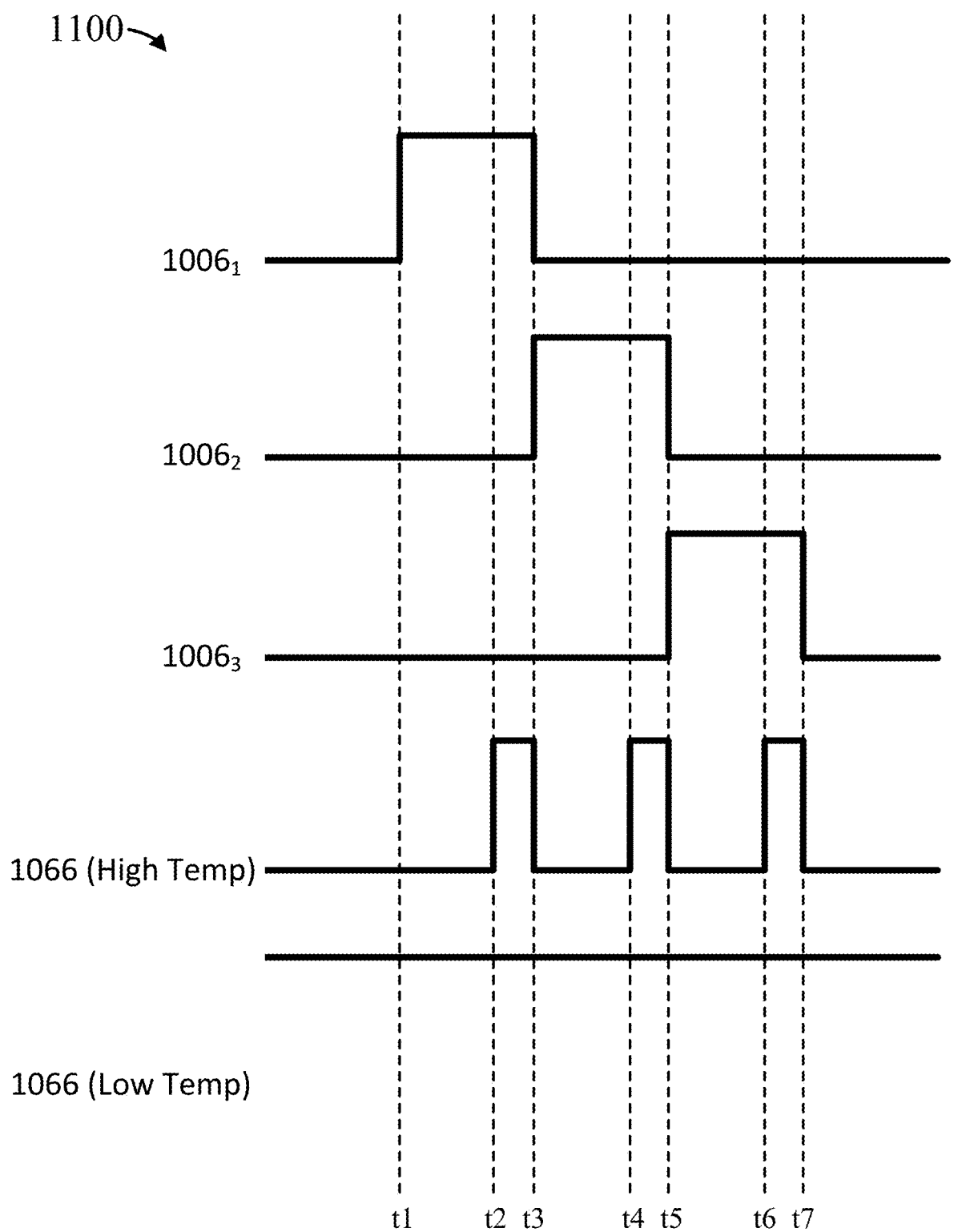
FIG. 11 is a signal timing diagram illustrating the driving signals for three pixels having a display pixel drive circuit in accordance with the subject matter described herein.

FIG. 11 is a signal timing diagram 1100 illustrating one possible implementation of the driving signals for three display pixels having the configuration of display pixel 1000 from FIG. 10. In this example, the three display pixels are from adjacent rows of an active matrix, with $1006_1$ denoting the state of the driver electrode of a display pixel $1000_1$ located in the first row that is activated during an update, $1006_2$ denoting the state of the driver electrode of a display pixel $1000_2$ located in the second row that is activated during an update, and $1006_3$ denoting the state of the driver electrode of a display pixel $1000_3$ located in the third row that is activated during an update. Enable signal 1066 is a global signal that controls the activation and deactivation of transistor $1060_1$ of display pixel $1000_1$, transistor $1060_2$ of display pixel $1000_2$, and transistor $1060_3$ of display pixel $1000_3$.

When the measured ambient temperature is low enough to be below the threshold for which temperature-induced display artifacts such as lateral coupling and blooming are typically most-pronounced, enable signal 1066 is maintained in a high state during updates to the display to activate transistor $1060_2$ and allow the voltage applied to subpixel electrode $1001a_2$ to also be applied to subpixel electrode $1001b_2$. The state of enable signal 1066 in this low temperature mode is denoted by "1066 (Low Temp)" in FIG. 11.

In the following description of FIG. 11, enable signal 1066 is being controlled in a high temperature mode, meaning that the measured ambient temperature is high enough that temperature-induced display artifacts are likely to occur if the display is driven such that the full voltage or charge applied to subpixel electrode $1001a_2$ is also applied to subpixel electrode $1001b_2$. The state of enable signal 1066 in this high temperature mode is denoted by "1066 (High Temp)" in FIG. 11.

As shown in FIG. 11, at time t1, the driver electrode $1006_1$ is driven high to select the row of display pixels including display pixel $1000_1$ for updating.

At time t2, enable signal 1066 is toggled high to activate transistor $1060_1$ and allow the voltage applied to subpixel electrode $1001a_1$ to be applied to subpixel electrode $1001b_1$ for a portion of the time it is applied to subpixel electrode $1001a_1$.

At time t3, the driver electrode $1006_1$ is driven low to deselect the row of display pixels including display pixel $1000_1$, and the driver electrode $1006_2$ is driven high to select the row of display pixels including display pixel $1000_2$ for updating. Enable signal 1066 is also toggled low at time t3 to deactivate transistor $1060_1$ and interrupt the connection between subpixel electrode $1001a_1$ and subpixel electrode $1001b_1$.

At time t4, enable signal 1066 is toggled high to activate transistor $1060_2$ and allow the voltage applied to subpixel electrode $1001a_2$ to be applied to subpixel electrode $1001b_2$ for a portion of the time it is applied to subpixel electrode $1001a_2$.

At time t5, the driver electrode $1006_2$ is driven low to deselect the row of display pixels including display pixel $1000_2$, and the driver electrode $1006_3$ is driven high to select the row of display pixels including display pixel $1000_3$ for updating. Enable signal 1066 is also toggled low at time t5 to deactivate transistor $1060_2$ and interrupt the connection between subpixel electrode $1001a_2$ and subpixel electrode $1001b_2$.

At time t6, enable signal 1066 is toggled high to activate transistor $1060_3$ and allow the voltage applied to subpixel electrode $1001a_3$ to be applied to subpixel electrode $1001b_3$ for a portion of the time it is applied to subpixel electrode $1001a_3$.

Finally, at time t7, the driver electrode $1006_3$ is driven low to deselect the row of display pixels including display pixel $1000_3$. Enable signal 1066 is also toggled low at time t7 to deactivate transistor $1060_3$ and interrupt the connection between subpixel electrode $1001a_3$ and subpixel electrode $1001b_3$.

Accordingly, it can be seen that the configuration of display pixel 1000 enables the impedance between subpixel electrode $1001a$ and subpixel electrode $1001b$ to be controlled by the duty ratio and/or voltage level of enable signal 1066, and hence the voltage difference between subpixel electrode $1001a$ and subpixel electrode $1001b$ can be fine-tuned and optimized.

This configuration provides additional options for implementing temperature-compensating drive schemes for electro-optic displays. For example, in a low temperature mode, the enable signal 1066 can be set to provide a constant connection between each subpixel electrode $1001a$ and its respective subpixel electrode $1001b$ to maximize the area of each display pixel electrode that is energized and driving the charged particles in the electrophoretic medium. When the display enters a high temperature mode, the voltage provided to subpixel electrode $1001b$ can be accurately regulated such that the contrast ratio and update speed of the display is maintained without introducing the image artifacts discussed above.

Accordingly, as demonstrated herein, the inventive multi-element display pixel electrode layouts and display pixel drive circuits can mitigate the performance variation of electrophoretic displays that occurs due to changes in ambient temperature. It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The contents of all of the aforementioned patents and applications are incorporated by reference herein in their entireties.

The invention claimed is:

1. An electro-optic display comprising:
a first subpixel electrode and a second subpixel electrode associated with a display pixel;
an electrophoretic display medium disposed between a common electrode and the first and second subpixel electrodes;
a display controller circuit in electrical communication with the common electrode and a first transistor associated with the display pixel, the display controller circuit capable of applying waveforms to the display pixel by applying one or more time-dependent voltages between the common electrode and the first subpixel electrode via the first transistor, wherein the one or more time-dependent voltages are applied to the first subpixel electrode; and
a second transistor in electrical communication with the first subpixel electrode and the second subpixel electrode, wherein a first enable signal activates the second transistor to place the first subpixel electrode and the second subpixel electrode into electrical communication.

2. The electro-optic display of claim 1 further comprising a temperature sensor disposed proximate to the display pixel.

3. The electro-optic display of claim 2 wherein the first enable signal activates the second transistor based on a measurement of ambient temperature from the temperature sensor.

4. The electro-optic display of claim 2 wherein the temperature sensor controls the first enable signal to activate the second transistor based on a measurement of ambient temperature.

5. The electro-optic display of claim 1 further comprising a third transistor in electrical communication with the second subpixel electrode and the common electrode.

6. The electro-optic display of claim 5 wherein a second enable signal activates the third transistor to drain a remnant charge from the second subpixel electrode.

7. The electro-optic display of claim 6 wherein the second enable signal is controlled by a row selection signal associated with a row of display pixels, wherein the display pixel is not a display pixel of the row of display pixels.

8. The electro-optic display of claim 2 further comprising a third transistor in electrical communication with the common electrode and a fourth transistor, wherein the fourth transistor is in electrical communication with the second subpixel electrode.

9. The electro-optic display of claim 8 wherein the first enable signal deactivates the fourth transistor when the second transistor is activated.

10. The electro-optic display of claim 9 wherein a second enable signal activates the third transistor to drain a remnant charge from the second subpixel electrode.

11. The electro-optic display of claim 10 wherein the second enable signal is controlled by a row selection signal associated with a row of display pixels, wherein the display pixel is not a display pixel of the row of display pixels.

12. The electro-optic display of claim 1 further comprising a physical gap between the first subpixel electrode and the second subpixel electrode.

13. The electro-optic display of claim 1 further comprising a physical gap between at least one adjacent edge of the first and second subpixel electrodes.

14. An electro-optic display comprising:
a first subpixel electrode and a second subpixel electrode associated with a display pixel;
an electrophoretic display medium disposed between a common electrode and the first and second subpixel electrodes;
a display controller circuit in electrical communication with the common electrode and a first transistor associated with the display pixel, the display controller circuit capable of applying waveforms to the display pixel by applying one or more time-dependent voltages between the common electrode and the first subpixel electrode via the first transistor, wherein the one or more time-dependent voltages are applied to the first subpixel electrode; and
a second transistor in electrical communication with the first subpixel electrode and a third transistor,
wherein the third transistor is in electrical communication with the second subpixel electrode, and
wherein a row selection signal associated with the display pixel activates the first transistor and the second transistor to place the first subpixel electrode into electrical communication with the third transistor.

15. The electro-optic display of claim 14 further comprising a temperature sensor disposed proximate to the electrophoretic display medium.

16. The electro-optic display of claim 14 wherein a second enable signal activates the third transistor.

17. The electro-optic display of claim 16 wherein the second enable signal is pulsed at a predetermined rate when the first transistor and the second transistor are activated.

18. The electro-optic display of claim 16 wherein the third transistor is activated for a subset of the time the first transistor and the second transistor are activated.

19. The electro-optic display of claim 14 further comprising a physical gap between the first subpixel electrode and the second subpixel electrode.

20. The electro-optic display of claim 14 further comprising a physical gap between at least one adjacent edge of the first and second subpixel electrodes.

* * * * *